(12) United States Patent
La Schiazza et al.

(10) Patent No.: US 12,189,800 B1
(45) Date of Patent: Jan. 7, 2025

(54) AUTOMATED QUEUE GENERATION

(71) Applicant: Amazon Technologies, Inc., Seattle, WA (US)

(72) Inventors: Benjamin La Schiazza, Redwood City, CA (US); Christopher McGilliard, Seattle, WA (US); David Lawrence Webb, Lynnwood, WA (US); Tim Pritchard, Seattle, WA (US); Catherine Du Pont-Thibodeau, Montreal (CA)

(73) Assignee: Amazon Technologies, Inc., Seattle, WA (US)

( * ) Notice: Subject to any disclaimer, the term of this patent is extended or adjusted under 35 U.S.C. 154(b) by 336 days.

(21) Appl. No.: 17/690,924

(22) Filed: Mar. 9, 2022

(51) Int. Cl.
*G06F 21/62* (2013.01)
*G06F 16/635* (2019.01)
*G06F 16/638* (2019.01)

(52) U.S. Cl.
CPC ........ *G06F 21/6218* (2013.01); *G06F 16/637* (2019.01); *G06F 16/639* (2019.01); *G06F 2221/2141* (2013.01)

(58) Field of Classification Search
CPC ... G06F 21/6218; G06F 16/637; G06F 16/639
USPC .......................................................... 726/27
See application file for complete search history.

(56) References Cited

U.S. PATENT DOCUMENTS

| 2021/0297469 | A1* | 9/2021 | Korb | H04L 65/612 |
| 2021/0392223 | A1* | 12/2021 | Coffman | G06F 1/1688 |
| 2022/0253589 | A1* | 8/2022 | Munoz | H04N 21/2668 |

OTHER PUBLICATIONS

U.S. Appl. No. 17/673,243, "Techniques for Moving Content Playback", Feb. 16, 2022, 47 pages.

* cited by examiner

*Primary Examiner* — Kambiz Zand
*Assistant Examiner* — Phuc Pham
(74) *Attorney, Agent, or Firm* — Kilpatrick Townsend & Stockton LLP

(57) ABSTRACT

Described herein are approaches for generating a new queue based on an existing queue. This may include receiving a request to transfer the existing queue from a first device to a second device. A set of move criteria may be evaluated using a playback context, a user profile, a configuration associated with the second device, and/or a level of access constraints. Depending on the results of the evaluation, the existing queue may be completely reformulated to define the new queue. The second device may then be instructed to play the new queue.

20 Claims, 6 Drawing Sheets

AUTOMATED QUEUE GENERATION

BACKGROUND

A queue can include an ordered set of objects such as media objects. For example, a music queue can include a set of music tracks, a video queue can include a set of video tracks, etc. Entities, such as a user of a computing device, can use the queue to experience various media in various orders. For example, the entity can select a queue, and the computing device can output, in a specified order, the media or other content included in the queue. The computing device can generate, based on input from the user and other relevant input, the queue. But, the queue may not be transferrable. For example, a first computing device may generate a first queue, and the user may switch devices (e.g., the user may move to a different location that includes a second computing device and not the first computing device). Accordingly, the second computing device may not include the first queue, and, to continue experiencing the media or other content, the user may be required to select, or otherwise generate using the second computing device, a second queue.

BRIEF DESCRIPTION OF THE DRAWINGS

Various embodiments in accordance with the present disclosure will be described with reference to the drawings, in which.

DETAILED DESCRIPTION

Figure 1:
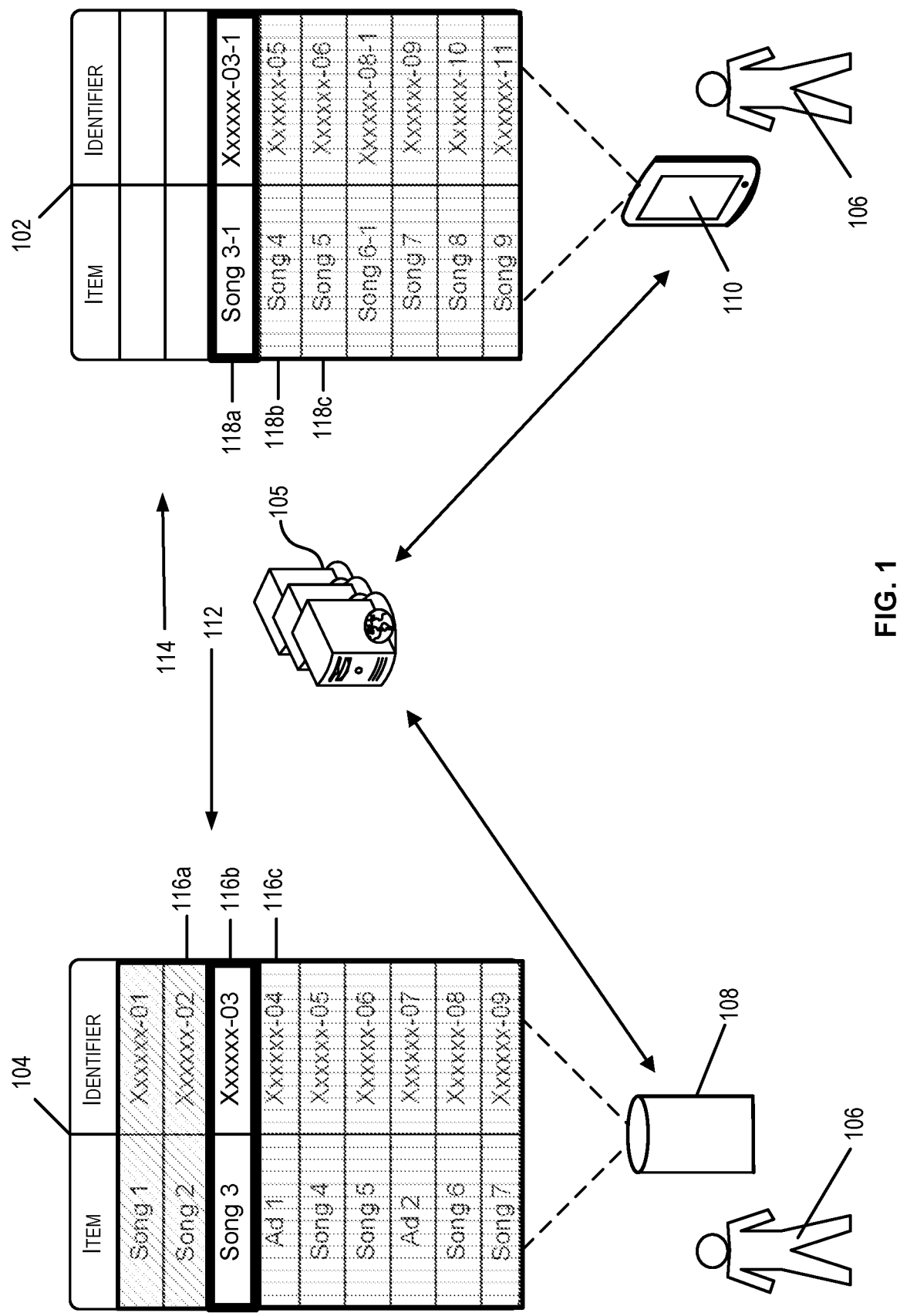
FIG. 1 illustrates a diagram of a queue that can be generated from an existing queue, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples described herein are directed to, among other things, various techniques for generating a queue from an existing queue. The queue, the existing queue, or a combination thereof may be a music queue that includes an ordered set of music tracks that, when the queue is accessed by a client device, outputs content associated with the music tracks. The approaches described herein may be applicable to queues that include different types of content items (e.g., podcasts, videos, presentations, and the like). A client device (e.g., a personal computer, a mobile phone, a voice-controlled multimedia device, a smart speaker, etc.) can interact with a service provider computer to perform operations relating to generating a queue from an existing queue by determining, or otherwise receiving, and evaluating move criteria. The move criteria may indicate how or whether a queue can be transferred or otherwise moved from a first client device to a second client device. Evaluating the move criteria can involve a playback context associated with the first client device, a user profile associated with the first client device and/or the second client device (e.g., a subscription level), a configuration (e.g., device capabilities) associated with the second client device, a level of access (e.g., license limitations) associated with a library of electronic content items, and/or any suitable combination thereof. The user profile can indicate a set of content that is accessible by the user. For example, the user profile of the first client device may allow access to a first set of content, and the user profile of the second client device may allow access to a second set of content that is different than the first set of content. Upon determining that the move criteria are satisfied, the second client device may receive the queue and may play or otherwise access and output the content of the queue. The content of the queue may be altered based on the move. For example, fewer (or more) music tracks may be available (e.g., based on the user profile or the configuration) on the queue accessed via the second client device. Additionally or alternatively, ancillary content (e.g., advertisements) may be added to (or removed from) the queue based on the move.

A user may initiate movement of content queues between devices/locations for various reasons. For example, the user may physically move from a first room where content is playing (e.g., on a smart speaker) to a second room and may want that the same content continue playing in the second room (e.g., on a different smart speaker), the user may leave their home where content is playing on a television set and may want the content to continue playing on a set of headphones or a smartphone, the user may have content playing in their car and may want that same content to continue playing in the user's home (e.g., on a desktop computer), and other similar movements between any suitable device capable of playing content queues. In some examples, the movement of a queue between devices and/or locations may be triggered by a user making such a request (e.g., via a voice command, via an interaction with a user interface, etc.). In some examples, the movement of a queue between devices and/or locations may be triggered in an automated manner. For example, using input signals from other devices (e.g., geographic location, signals from connected devices, etc.), it may be detected when the content should be moved. For example, as the user leaves their home where a queue of music is playing on a smart speaker system, a geographic trigger, state change of a connected door lock, detection that a security system has been alarmed, or other such information can trigger automatic transfer of the queue from the smart speaker system to the connected headphones.

In a particular example, a user can access a music queue on a first computing device. The music queue can include a first set of music tracks. The user may initiate a move, which may involve moving the music queue from the first computing device to a second computing device. The first computing device and the second computing device may have different configurations, be associated with different user profiles and/or user accounts, or have other parameters related to the music queue. A server may receive data that can include a request to play or otherwise access the music queue on the second computing device. This request can be sent from the first computing device or from the second computing device. The server can determine or otherwise evaluate move criteria relating to the music queue. For example, the move criteria may indicate changes (if any) to the music queue being accessed on the second computing device as compared to being accessed on the first computing device. In evaluating the move criteria, the server can determine contextual information of the computing devices, profile information of the computing devices, configuration information of the computing devices, level of access information of the computing devices, other suitable information, or any suitable combination thereof. For example, the first computing device may be configured to play ultra high-definition content (e.g., virtually lossless audio content at a bitrate between 3000 kbps and 4000 kbps), whereas the second computing device may be configured to only play up to a standard-definition content (e.g., lossy audio content at a bitrate of between 300 kbps and 400 kbps). Additionally, the first computing device may be associated with a subscription plan that allows access to a larger amount of content than a subscription plan associated with the second computing device. Accordingly, the server can regenerate a new music queue based on the differences between the devices. For example, this can include the server removing/adding a subset of music tracks from/to the music queue to conform to the configuration of the second computing device. Additionally, the server can add advertisements to the music queue based on the respective subscription plan of the second computing device. The server can instruct the second computing device to play the music queue (having the updates applied) on the second computing device. In some examples, the currently playing track (when the move was requested) can be resumed, and, in other examples, the currently playing track may be skipped to conform to the configuration, user profile, or the like of the second computing device.

A music queue can be generated on a computing device for allowing a user to experience continuous music without providing continuous or periodic input. In some examples, the user may desire to switch computing devices and use a second computing device (e.g., instead of the first computing device) to access and play the music queue. Conventionally, to play the music queue on the second computing device, the user provides input to the second computing device that causes the second computing device to request generation of a completely new music queue. In this example, the new music queue may be generated without regard to the context of the original music queue (e.g., how the queue was started, what songs had previously been played, what song was currently playing, settings for the songs, what songs were upcoming, and the like). While the new music queue may include overlapping music tracks, the user historically stopped the music queue playing on the first computing system, provided additional input to the second computing system for generating the new music queue, and the second computing device requested generation of the new music queue. Accordingly, based on the described historical process, excessive input from the user and excessive computing resources from the second computing device are used to generate the new music queue.

Techniques described herein include generating a queue based on an existing queue. While described herein with respect to a music queue, the queue can include any suitable ordered list of content accessible by a computing device. The techniques described herein improve the generation of a music queue from an existing queue by reducing an amount of input provided by the user and by reducing an amount of computing resources used to generate the music queue based on the existing queue. For example, to access and/or play the music queue on a second device, the user does not need to provide input that causes the second device to generate the music queue. Additionally, the amount of computing resources to access and/or play the music queue on the second device is reduced using the techniques described herein since the existing queue is adjusted (instead of generating from scratch a separate music queue for the second device).

Turning now to the figures, FIG. 1 illustrates a diagram of a queue 102 that can be generated from an existing queue 104. The queue 102 and the existing queue 104 can each be or otherwise include an ordered set of content (e.g., multimedia content like music, video, and the like). The existing queue 104 may be generated, for example in response to receiving input from a user 106, by or otherwise on a first client device 108. For example, the existing queue 104 may have been generated by the first client device 108 requesting generation of the queue by the service provider 302. The queue 102 may be generated by a service provider 302 in response to receiving a request to move the existing queue 104 to a second client device 110. The first client device 108, the second client device 110, or a combination thereof may include any suitable type of computing device such as, but not limited to, a wearable device, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, a high-definition television, a web-enabled high-definition television, a set-top box. For example, the first client device 108 is illustrated as a voice-controlled multimedia device, and the second client device 110 is illustrated as a mobile phone.

The user 106 may decide to move (e.g., push or pull) the existing queue 104 to the second client device 110. The user 106 may "push" the existing queue 104 to the second client device 110 by requesting a move from the first client device 108, and the user 106 may "pull" the existing queue 104 to the second client device 110 by requesting the move from the second client device 110. Thus, the service provider 105 can receive the request to move the existing queue 104 from the first client device 108 or the second client device 110. In some examples, the second client device 110 may transmit the request (a pull request) to the service provider 105, and, in other examples, the first client device 108 may transmit the request (a push request) to the service provider 105. The service provider 105 can determine first about the existing queue 104, second data relating to the first client device 108, third data relating to the second client device 110, and other suitable data surrounding the songs in the existing queue 104. Based on the received data, the service provider 105 can generate the queue 102. The service provider 105 can transmit the queue 102 to the second client device 110 with instructions that may cause the second client device 110 to play or otherwise execute the queue 102 by resuming where the existing queue 104 was playing during the request to move or by starting to play a different track.

The existing queue 104 can include a first set of content 112, and the queue 102 can include a second set of content 114, which may be different than the first set of content 112. For example, the first set of content 112 is illustrated as including content A 116*a* ("Song 2"), content B 116*b* ("Song 3"), and content C 116*c* ("Ad 1"). The second set of content 114 is illustrated as including content D 118*a* ("Song 3-1"), content E 118*b* ("Song 4"), and content F 118*c* ("Song 5"). The first client device 108 may have previously played or otherwise output content A 116*a* and may be currently playing or otherwise outputting content B 116*b* during the request to move the existing queue 104. Additionally, content C 116*c* may be the next content that the first client device 108 may play subsequent to content B 116*b*. During content B 116*b*, the user 106 may decide to move the existing queue 104 to the second client device 110. To initiate the move, the user 106 may use the first client device 108 or the second client device 110 to initiate a transfer request to the service provider 105. In some examples, the type of transfer request may depend on the type of device at which the transfer request is initiated. For example, if the device includes a graphical user interface, the request may be initiated by selecting a graphical element relating to transfer (e.g., a button that identifies the other client device and an option to transfer). As an additional example, if the device includes an audio interface, the request may be initiated by providing a voice command to the device relating to transfer (e.g., a command that instructs the device to play the existing queue 104 at the other device).

Responsive to receiving the transfer request, the service provider 105 can generate the queue 102, which includes the second set of content 114. The service provider 105 may transmit (e.g., with the generated queue 102) instructions to the second client device 110 that may cause the second client device 110 to resume playing with content D 118*a*. In some examples, content D 118*a* may be nearly identical (e.g., similar content, but different configuration of the content) to content B 116*b*, which was playing or otherwise being output when the request for the move was submitted. For example, content D 118*a* may be the same song as content B 116*b* except that content D 118*a* is a higher quality song than content B 116*b*. Additionally, while the existing queue 104 includes content C 116*c* (which is an advertisement), the queue 102 may not include content C 116*c*. This may be because the subscription associated with the second client device 110 provides for advertisement-free playback.

The differences between the existing queue 104 and the queue 102 can be determined by the service provider 105. For example, the service provider 105 can receive encoding or other data from the first client device 108 and the second client device 110. The received data can include a playback context associated with the first client device 108, a user profile associated with the first client device 108, a second user profile (which may be different than the first user profile) associated with the second client device 110, user device information associated with the second client device 110, a level of access (e.g., constraints) associated with a library of music tracks that includes the first set of content 112, and any other suitable information. In some examples, the received data may also or alternatively include account information, which may define a relationship between the user profiles and one or more accounts. For example, the first and second user profiles may be under the same account, under separate accounts (e.g., the first user profile under a first account and the second user profile under a second account), under a single plan that includes multiple accounts (e.g., a family plan that includes multiple separate accounts, each with their own profile), and in any other configuration. Based on the received data, the service provider 105 can evaluate a set of move criteria (e.g., a set of rules that define conditions for transferring queues between devices). Based on the results of the evaluation, the service provider 105 may adjust the existing queue 104 to generate the queue 102. For example, the second user profile may include access to a broader set of content than the first user profile. Accordingly, the service provider 105 can add content to the queue 102 such that the added content was not accessible via the existing queue 104. In another example, the user device information may indicate a maximum quality of content accessible by the second client device 110. Accordingly, the service provider 105 can add or remove content with respect to the existing queue 104 based on the quality of content. For example, the service provider 105 can add higher quality content to the queue 102 if the maximum quality of content accessible by the second client device 110 is higher than that of the first client device 108. The service provider 105 can adjust the existing queue 104 for generating the queue 102 based on the received data, and, subsequently, the service provider 105 can provide the queue 102, along with instructions that cause the queue 102 to be played or otherwise executed, to the second client device 110.

Figure 2:
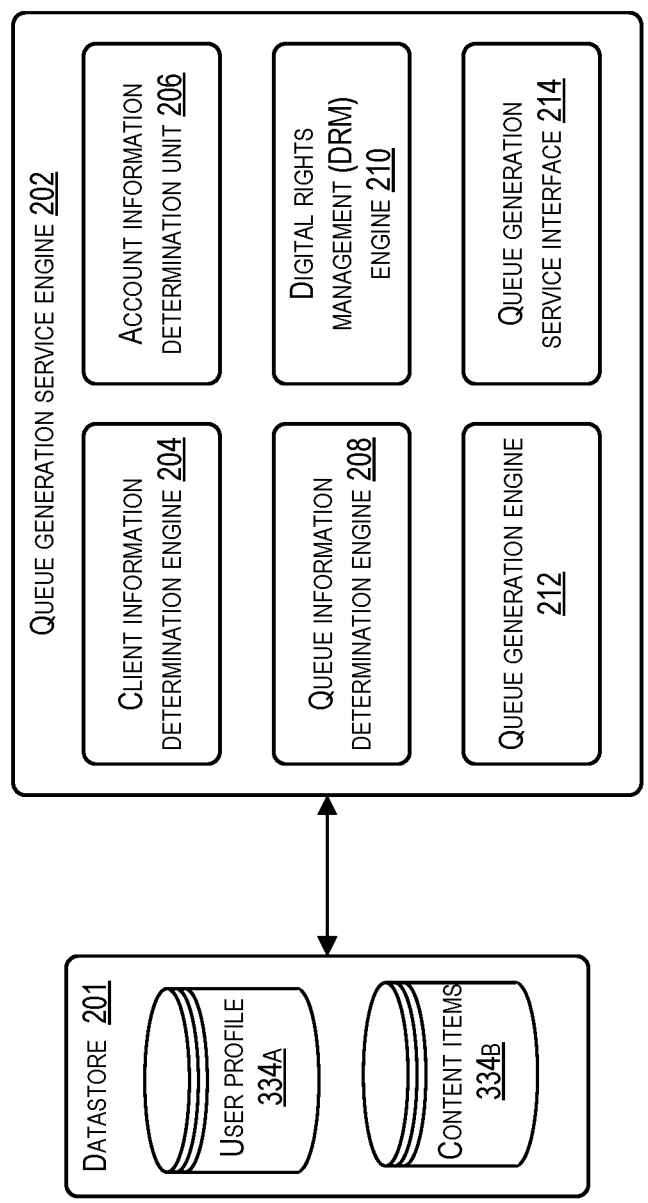
FIG. 2 illustrates an example block diagram of a queue generation service system, according to at least one example.

FIG. 2 illustrates an example block diagram of a queue generation service system 200, according to at least one example. As illustrated, the queue generation service system 200 includes a queue generation service engine 202 that is communicatively coupled (e.g., via a wired connection or a wireless connection) to a data store 201. The queue generation service system 200 may be implemented by a service provider such as the service provider 105 and/or by a client device. The data store 201 includes databases 334. As illustrated, the databases 334 include a user profile database 334A and a content items database 334B. In an example, the databases 334 and/or the data store 201 can include any other suitable data, databases, libraries, and the like.

The queue generation service engine 202 includes a client information determination engine 204, an account information determination unit 206, a queue information determination engine 208, a digital rights management (DRM) engine 210, a queue generation engine 212, and a queue generation service interface 214. In an example, the queue generation service engine 202 can include any other suitable engines, modules, models, units, and the like.

The client information determination engine 204 can determine client information relating to a client (e.g., a client device such as the first client device 108 or the second client device 110). For example, the client information determination engine 204 can request the client information from the client, access the client information from a database, request the client information from a separate (e.g., third-party) service, determine the client information based on other inputs (e.g., from a client device), etc. In some examples, the client information determination engine 204 can receive the client information from client devices such as the first client device 108, the second client device 110, other suitable client devices, or any suitable combination thereof.

In some examples, the client information can include setting information, technical information, and any other suitable client information. The setting information can include parental controls, visual likes, language settings, locale settings, time zone, ad context, any other suitable setting information, or any suitable combination thereof. The technical information can include a client type, a client identifier, client capabilities, and any other suitable technical information. The client type can include a mobile application, a web player, a desktop application, a voice-controlled (or otherwise-controlled) multimedia device having (or not having) a visual screen, one or more ear buds, a stereo system (e.g., in a vehicle), other suitable client types, or any suitable combination thereof. The client identifier can include a unique identifier (e.g., a serial number, a device identification number, and the like) to the client. The client capabilities can indicate types of content the client can access and/or play. For example, the client capabilities can indicate whether the client can play standard audio files (e.g., bit rates at approximately 320 Kbs), high definition audio files, ultra-high definition audio files (e.g., lossless audio files with bit rates at approximately 3700 Kbs), spatial audio files (e.g., 3D audio), and the like. Additionally, the technical information can include configuration settings, a state of the client (e.g., whether the client is on, playing a song, etc.), and the like.

The account information determination unit 206 may be configured to determine the account information associated with a user (e.g., the user 106). For example, the account information determination unit 206 can request the account information from the client, access the account information from a database, request the account information from a separate (e.g., third-party) service, determine the account information based on other inputs (e.g., from a client device), etc. In some examples, the account information determination unit 206 can receive the account information from client devices such as the first client device 108, the second client device 110, other suitable client devices, or any suitable combination thereof.

The account information may be associated with the user of the client. In some examples, the user can be a user of more than one client (e.g., the first client device 108 and the second client device 110). In such examples, the account information can be associated with each client (or any suitable subset thereof) associated with the user. The account information can include information about an account of a user, profile(s) of the account, a type of subscription, global preferences, other suitable account information, or any suitable combination thereof. The type of subscription can correspond to an amount of content accessible by a profile associated with the user, a quality of content accessible by the profile associated with the user, etc. Global preferences may be selected by the user and may be associated with any device used by the user.

In some examples, the account information may include information indicative of user preferences as they related to content items (e.g., information about favorited items, upvoted items, downvoted items, etc.). Information about these preferences may be global (e.g., apply to all content items irrespective of client device) and/or may be specific to a client device (e.g., songs upvoted or downvoted on a particular client device may be related to songs played only on the client device).

In some examples, the account information may include profile information that defines relationships between certain accounts and certain profiles. As introduced herein, this may account for accounts that includes more than one profile and accounts that have a primary account and one or more other accounts, each of which may have one or more profiles. In some examples, the techniques described herein may enable queue playback on clients that are not only associated with different profiles, but also with different accounts. For example, a user of a first client associated with a first account may request that a queue be played on a second client associated with a second different account. To enable inter-account playback of queues, access controls may be put in place to allow the users to grant permissions. For example, the user of the second different account may grant the account holder of the first account permissions to send queues to the second client and/or other clients associated with the second account. In some examples, the account information determination unit 206 may be configured to grant users temporary access to subscriptions. For example, such temporary access may be given as part of requesting playback of a queue. Such temporary access may be time-bound and may be desirable to give users a preview of certain content to which they do not typically have access.

The queue information determination engine 208 can determine queue information relating to a queue that may be playing on a client. For example, the queue information determination engine 208 can request the queue information from the client, access the queue information from a database, request the queue information from a separate (e.g., third-party) service, determine the queue information based on other inputs (e.g., from a client device), etc. In some examples, the queue information determination engine 208 can receive the queue information from client devices such as the first client device 108, the second client device 110, other suitable client devices, or any suitable combination thereof.

The queue information can include information relating to a context of a queue (e.g., that is currently playing on a client). For example, the queue information can include an encoding of the user's original intent associated with the queue, a current track playing in the queue, a list of content in the queue, identifiers from the queue, other suitable queue information, or any suitable combination thereof. The user's original intent can indicate a type, class, genre, etc. of content that, based on input from the user, indicates content desired to be accessed and/or experienced by the user. For example, the queue information may effectively capture a context relating to the queue. In some examples, this may also include the manner in which the user first initiated the queue (e.g., selected an album, selected a playlist, selected a radio station, selected a set of songs, and the like), information about what songs from the queue (and, in some examples, advertisements) have been played, information about what song is currently playing when the request is initiated, and information about future songs (and, in some examples, advertisements) are queued for playing.

The DRM engine 210 may determine limitations or other types of constraints relating to access and/or use of content, for example, in the content items database 334B. For example, the DRM engine 210 can request the limitations from the client, access the limitations from a database, request the limitations from a separate (e.g., third-party) service, determine the limitations based on other inputs (e.g., from a client device), etc. In some examples, the DRM engine 210 can receive the limitations from client devices such as the first client device 108, the second client device 110, other suitable client devices, or any suitable combination thereof. In some examples, the limitations can relate to license limitations or other similar or suitable constraints. The limitations may indicate a level of access of the queue generation service engine 202 (or the user) to content in the content items database 334B. For example, the limitations may indicate all sorts of constraints such as, for example, number of plays, whether play is allowed with other content, whether play is allowed on the type of client device, whether play is allowed to be specifically selected, whether play may be included in a randomized set, any various other types of constraints.

The queue generation engine 212 may determine how to generate a queue from an existing queue. For example, the queue generation engine 212 may receive the client information (e.g., from the client information determination engine 204), the account information (e.g., from the account information determination unit 206), the queue information (e.g., from the queue information determination engine 208), and the limitations (e.g., from the DRM engine 210). The queue generation engine 212 can use the received information to evaluate move criteria that indicate conditions relating to moving an existing queue from a first client to a second client (e.g., generate a queue based on the existing queue). For example, the queue generation engine 212 can determine that, based on the input information, the move criteria indicates that one or more changes are to be applied to the existing queue for generating the queue. The queue generation engine 212 can use the received information to generate the queue. In some examples, the queue generation engine 212 may also be configured to generate other information to accompany the queue. For example, a user may request playback of a queue at a different device and indicate that the certain messages be included in the queue. Imagine a scenario in which a boyfriend creates a custom queue for his girlfriend, including a selection of songs and one or more personalized and unique messages (e.g., voice records of the boyfriend), and (with the correct permissions) causes the custom queue to be generated and played at the girlfriend's user device. In some examples, the boyfriend may be able to schedule a future time for playback of the queue at the girlfriend's user device.

The queue generation service interface 214 may include a suitable interface for communicating with a client, other (e.g., separate) services, and the like. For example, the queue generation service interface 214 can communicate with a first client, a second client, a third-party service, other suitable devices, or any suitable combination thereof. In some examples, the queue generation service interface 214 can be used to send or receive information with respect to one or more clients, separate services, and the like. For example, the queue generation service interface 214 can receive information (e.g., client information, account information, queue information, limitations, and the like) from one or more clients, third-party services, and the like. Additionally, the queue generation service interface 214 can receive the generated queue from the queue generation engine 212 and can transmit the generated queue (along with instructions for playback) to one or more clients. In some examples, the queue generation service interface 214 may exchange information with a service that supports voice-controlled instructions on certain client devices.

Figure 3:
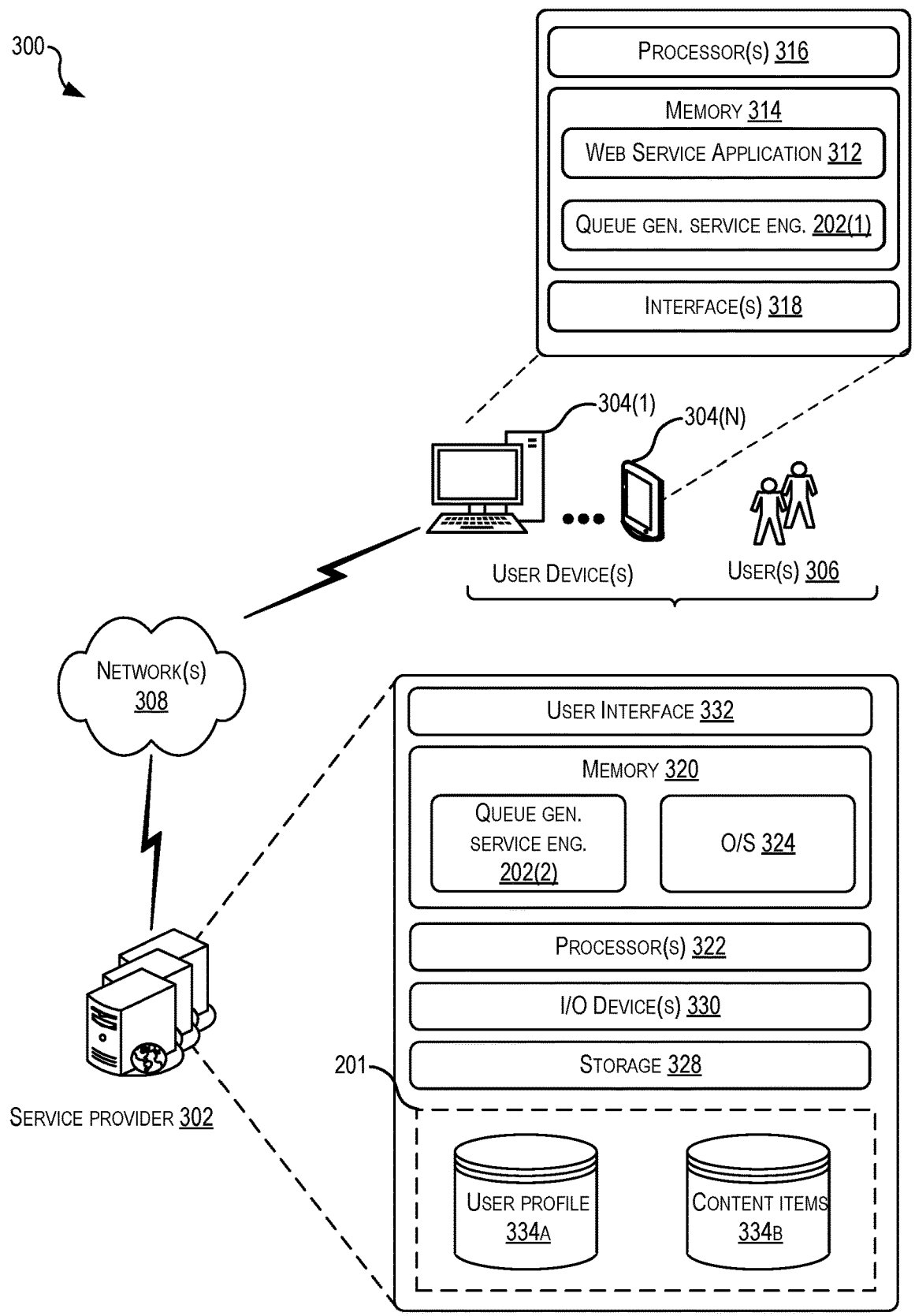
FIG. 3 illustrates an example schematic architecture for implementing techniques relating to generating a queue based on an existing queue, according to at least one example.

FIG. 3 is an example schematic architecture 300 for implementing techniques relating to generating a queue based on an existing queue, according to at least one example. The architecture 300 may include a service provider 302 (e.g., the service provider 105 described herein) in communication with one or more user devices 304(1)-304(N) (e.g., the client devices 108 and 110) via one or more networks 308 (hereinafter, "the network 308").

The user device 304 may be operable by one or more users 306 (e.g., the user 106) to interact with the service provider 302. The users 306 may be administrators, developers, or others that desire to test or utilize operations of the queue generation techniques described herein. The user device 304 may be any suitable type of computing device such as, but not limited to, a wearable device, a tablet, a mobile phone, a smart phone, a network-enabled streaming device (HDMI micro-console pluggable device), a PDA, a laptop computer, a desktop computer, a thin-client device, a tablet computer, a high-definition television, a web-enabled high-definition television, a set-top box, etc. For example, the user device 304(1) is illustrated as a desktop computer, while the user device 304(N) is illustrated as an example of a handheld mobile device.

The user device 304 may include a memory 314 and processor(s) 316. In the memory 314 may be stored program instructions that are loadable and executable on the processor(s) 316, as well as data generated during the execution of these programs. Depending on the configuration and type of user device 304, the memory 314 may be volatile (such as random access memory ("RAM")) and/or non-volatile (such as read-only memory (ROM), flash memory, etc.).

In some examples, the memory 314 may include a web service application 312 and a version of the queue generation service engine 202 (e.g., 202(1)). The web service application 312 and/or the queue generation service engine 202(1) may allow the user 306 to interact with the service provider 302 via the network 308. The user device 304 may also include one or more interfaces 318 to enable communication with other devices, systems, and the like. The queue generation service engine 202, whether embodied in the user device 304 or the service provider 302, may be configured to perform the techniques described herein.

Turning now to the details of the service provider 302, the service provider 302 may include one or more computer system computers, perhaps arranged in a cluster of servers or as a server farm, and may host web service applications. The function of the service provider 302 may be implemented in a cloud-based environment such that individual components of the service provider 302 are virtual resources in a distributed environment. The service provider 302 also may be implemented as part of a content streaming service that provides for streaming of music, video, and other related files.

The service provider 302 may include at least one memory 320 and one or more processing units (or processor(s)) 322. The processor 322 may be implemented as appropriate in hardware, computer-executable instructions, software, firmware, or combinations thereof. Computer-executable instruction, software, or firmware implementations of the processor 322 may include computer-executable or machine-executable instructions written in any suitable programming language to perform the various functions described. The memory 320 may include more than one memory and may be distributed throughout the service provider 302. The memory 320 may store program instructions that are loadable and executable on the processor(s) 322, as well as data generated during the execution of these programs. Depending on the configuration and type of memory included in the service provider 302, the memory 320 may be volatile (such as RAM and/or non-volatile (such as read-only memory ("ROM"), flash memory, or other memory). The memory 320 may include an operating system 324 and one or more application programs, modules, or services for implementing the features disclosed herein including at least a version of the queue generation service engine 202 (e.g., 202(2)). For example, the queue generation service engine 202(2) may perform the functionality described herein.

The service provider 302 may also include additional storage 328, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 328, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the service provider 302 and/or part of the user device 304.

The service provider 302 may also include input/output (I/O) device(s) and/or ports 330, such as for enabling connection with a keyboard, a mouse, a pen, a voice input device, a touch input device, a display, speakers, a printer, or other I/O device.

In some examples, service provider 302 may also include one or more user interface(s) 332. The user interface 332 may be utilized by an operator, curator, or other authorized user to access portions of the service provider 302. In some examples, the user interface 332 may include a graphical user interface, voice interfaces, web-based applications, programmatic interfaces such as APIs, or other user interface configurations.

The service provider 302 may also include a data store 201. In some examples, the data store 201 may include one or more databases, data structures, or the like for storing and/or retaining information associated with the service provider 302 and which, in some examples, may be accessible by the user devices 304. For example, the data store 201 may include the user profile database 334A and the content items database 334B described herein.

Figure 4:
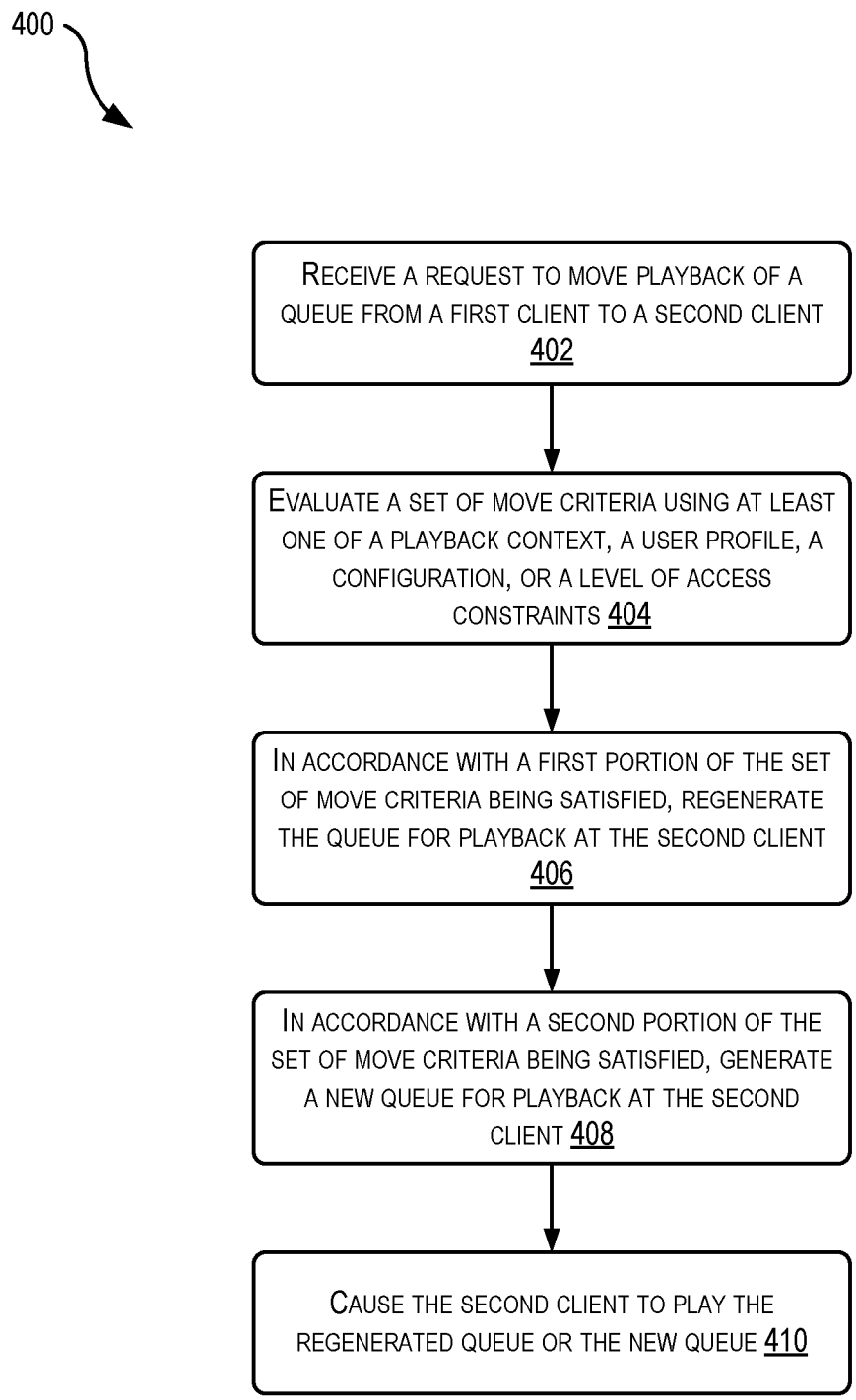
FIG. 4 illustrates an example of a flowchart showing a process for implementing techniques relating to generating a queue based on an existing queue, according to at least one example.
Figure 5:
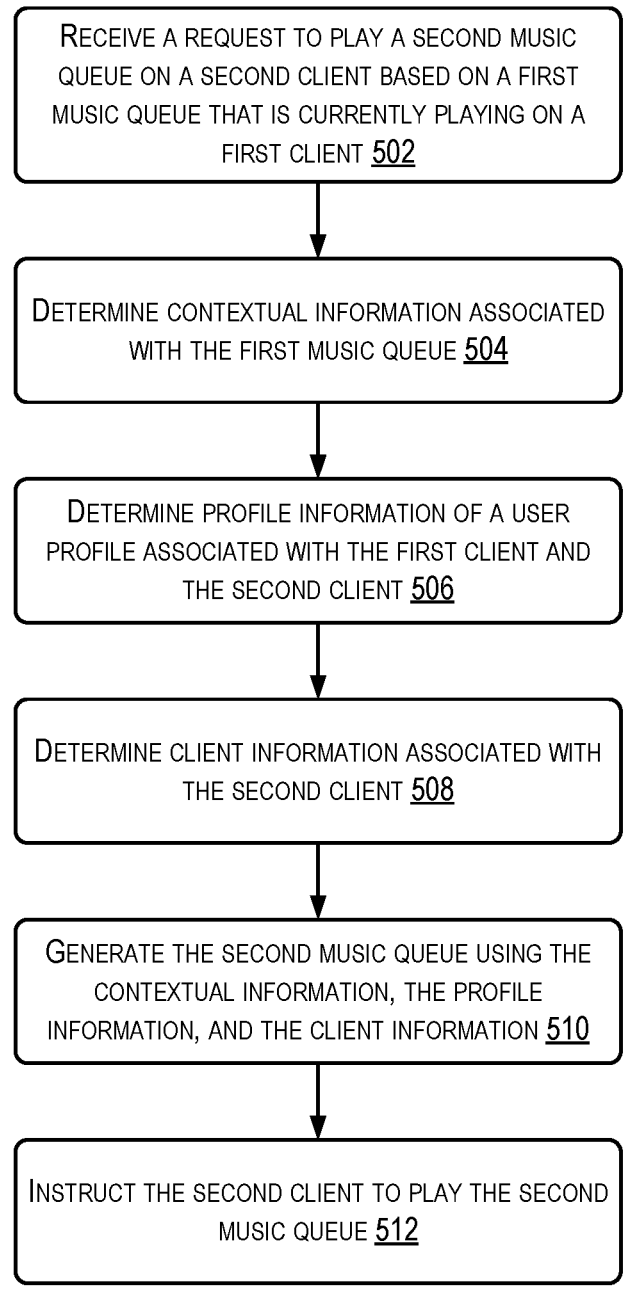
FIG. 5 illustrates another example of a flowchart showing a process for implementing techniques relating to generating a queue based on an existing queue, according to at least one example.

FIGS. 4 and 5 illustrate example flow diagrams showing respective processes 400 and 500, as described herein. The processes 400 and 500 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 4 illustrates an example flowchart showing a process 400 for implementing techniques relating to generating a queue based on an existing queue, according to at least one example. The process 400 in particular may represent an approach for generating a queue based on an existing queue that includes evaluating a set of move criteria. The queue generation service engine 202 (FIG. 2) embodied in the service provider 302 (FIG. 3) and/or within the user device 304 (FIG. 3) may perform the process 400. Thus, while the description below is from the perspective of the service provider 302, the user device 304 may also perform the process 400 or portions of the process 400 with at least some adjustments.

The process 400 may begin at block 402 by the service provider receiving a request to move playback of a queue from a first client to a second client. The request may be transmitted by the first client, by the second client, by a third client, by other suitable devices, or by any suitable combination thereof. The first client, the second client, and the third client may include a mobile user device, a voice-controlled multimedia device, a speaker system, a computer, or any other suitable device that can play and/or control the queue. The queue can include a first set of electronic content items, which can include music tracks, video tracks, other suitable multimedia tracks, or any suitable combination thereof. The queue can order the electronic content items and can play or otherwise execute and/or output the electronic content items in the order.

In some examples, the request can be received from the first client for pushing the queue from the first client to the second client. In other examples, the request can be received from the second client for pulling the queue from the first client to the second client. In yet other examples, the request can be received from a third client for moving the queue from the first client to the second client.

The process 400 may continue at block 404 by the service provider evaluating a set of move criteria using at least one of a playback context, a user profile, a configuration, or a set of level of access constraints. The playback context may be associated with the first client and may indicate an intent of the user, a content item currently playing, and the like. This information may be encoded in any suitable manner and made available or determined by the service provider. The user profile may be associated with the first client and the second client. The configuration may be associated with the second client and may indicate capabilities and other suitable information relating to the second client. The set of level of access constraints may be associated with a library of electronic content items (e.g., the content items database 334B). The set of level of access constraints may additionally be associated with license limitations relating to the electronic content items.

The playback context associated with the first client can include an encoding of an original user intent associated with the queue, a set of electronic content item identifiers corresponding to the first set of electronic content items, an identification of a current electronic content item of the first set of electronic content items, state information for at least one of the first client or the second client, other suitable information, or any combination thereof. The user profile can indicate a level of access of the user profile with respect to a library of electronic content items that can include the first set of electronic content items and a second set of electronic content items. The configuration associated with the second client can indicate client-specific constraints (e.g., maximum quality of output, etc.) associated with playback of electronic content items. The set of level of access constraints can correspond to or otherwise indicate digital rights management limitations corresponding to individual electronic content items in the library (e.g., the content items database 334B) of electronic content items.

In some examples, evaluating the set of move criteria can involve requesting information, accessing information, and providing information. For example, first information can be requested from the first client, the second client, the third client, or any suitable combination thereof. Additionally, second information, which can be stored by a computer server, can be accessed. The first information and the second information can be provided to a queue generation service to use when evaluating the set of move criteria.

The move criteria may include a first portion, a second portion, other suitable portions, and the like. The service provider, or any other suitable computer or computing device, can perform various evaluations of the move criteria. For example, the service provider can use the playback context to determine the intent of the user, currently playing and queued content items, and the like. Upon evaluation, the service provider can determine whether to, upon moving the queue, update the queue or the content items included therein. Additionally, the service provider can use the user profile to determine accessible content for the queue. For example, the service provider can determine a first user profile associated with the first client and a second user profile (which may include a different level of access to content compared to the access of the first user profile) associated with the second client, and the service provider can adjust, upon moving the queue, content of the queue based on the level of access associated with the first user profile and the second user profile. Additionally, the service provider can use the configuration to determine a quality of content for the move of the queue. For example, the first client may be configured to play content that includes a first maximum quality, whereas the second client may be configured to play content that includes a second maximum quality that is higher than the first maximum quality. Accordingly, the service provider 302 may adjust the queue, upon the move, based on the second maximum quality.

The process 400 may continue at block 406 by the service provider regenerating, in accordance with a first portion of the set of move criteria being satisfied, the queue for playback at the second client. The first portion of the set of move criteria can indicate whether a playback experience of the queue on the first client and the second client may be similar or identical. For example, the playback context, the user profile, the configuration, the level of access constraints, other suitable parameters, or any combination thereof may be similar or identical between the first client and the second client. Accordingly, satisfying the first portion of the set of move criteria can indicate that a first playback experience on the first client device is similar or identical to a second playback experience on the second client. The service provider can regenerate the queue and transmit the regenerated queue to the second client for playback. In some examples, the queue and the regenerated queue can include a matching predefined order of the first set of electronic content items. In some examples, the service provider may simply receive the queue and, in accordance with the first portion being satisfied, may transmit the queue to the second client.

The process 400 may continue at block 408 by the service provider generating, in accordance with a second portion of the set of move criteria being satisfied, a new queue for playback at the second client. The second portion of the set of move criteria can indicate that a playback experience of the queue on the first client and the second client may not be similar or identical. For example, the playback context, the user profile, the configuration, the level of access constraints, other suitable parameters, or any combination thereof may not be similar or identical between the first client and the second client. Accordingly, satisfying the second portion of the set of move criteria can indicate that a first playback experience on the first client device is not similar or identical to a second playback experience on the second client. The service provider can generate a new queue and transmit the new queue to the second client for playback. In some examples, the service provider can generate the new queue based on the user intent used to previously generate the queue.

The new queue can include a second set of electronic content items, which may be different than the first set of electronic content items. For example, the second set of electronic content items can be distinct from the first set of electronic content items with respect to an order of the second set of electronic content items, the presence or absence of an advertisement, the presence or absence of content tracks in the second set of electronic content items, versions of content items in the second set of electronic content items, or any suitable combination thereof. In some examples, one or more differences between the first set of electronic content items and the second set of electronic content items can be based on evaluating the set of move criteria. For example, the presence or absence of content tracks in the second set of electronic content items can be determined by the service provider based on the user account information, the configuration of the second client, other suitable parameters, or any suitable combination thereof.

In some examples, data that can be used for regenerating the queue, generating the new queue, or a combination thereof can be consistently, continuously, and/or periodically synchronized. For example, data relating to the configuration, the user profile, the contextual information, the level of access constraints, etc. can be synchronized consistently, continuously, and/or periodically (e.g., when new or updated data is available, once every hour/day/week, etc.). The service provider can make a call (e.g., to a database, to one or more of the clients, to a third-party service, or to other suitable sources) to verify the synchronized data prior to regenerating the queue, generating the new queue, or a combination thereof.

The process 400 may continue at block 410 by the service provider causing the second client to play the regenerated queue or the new queue. The service provider can cause the second client to play the regenerated queue in response to determining that the first portion of the move criteria is satisfied. The service provider can cause the second client to play the new queue in response to determining that the second portion of the move criteria is satisfied. To cause the second client to play the regenerated queue or the new queue, the service provider may transmit the regenerated queue or the new queue, respectively, to the second client. In some examples, the process 400 can further include causing the first client to cease playback of the queue (e.g., in response to receiving the request to move playback of the queue from the first client to the second client). In some examples, the first client does not cease playback, rather the techniques described herein may enable synchronized playback of the queue at the first client and the second client. For example, this may be desirable when the first client is a first voice-controlled multimedia device in a first room and the second client is a second voice-controlled multimedia device in a second room. The techniques described herein may enable the user to continue playing of the queue in the second room without impacting the playback in the first room. This approach may be expanded to result in synchronized playback of the queue on more clients than just the first and second.

FIG. 5 illustrates another example flowchart showing a process 500 for implementing techniques relating to generating a queue based on an existing queue, according to at least one example. The process 500 in particular may represent an approach for generating a queue based on an existing queue that includes using various types of accessed information to generate the queue. The queue generation service engine 202 (FIG. 2) embodied in the service provider 302 (FIG. 3) and/or within the user device 304 (FIG. 3) may perform the process 500. Thus, while the description below is from the perspective of the service provider 302, the user device 304 may also perform the process 500 or portions of the process 500 with at least some adjustments.

The process 500 may begin at block 502 by the service provider receiving a request to play a second music queue on a second client based on a first music queue that is currently playing on a first client. The first music queue can include a first set of music tracks. The request may include a push request, a pull request, or other suitable request for playing the second music queue. In some examples, the service provider can receive the request from the first client, the second client, the third client, other suitable clients, or any suitable combination thereof. The request may additionally involve a request to move the first music queue to the second client.

The process 500 may continue at block 504 by the service provider determining contextual information associated with the first music queue. The contextual information can include an encoding of an original user intent associated with the first music queue, a set of track identifiers corresponding to the first set of music tracks, an identification of a current music track of the first set of music tracks, state information for at least one of the first client or the second client, other suitable contextual information, or any suitable combination thereof. The service provider may receive the contextual information from the first client, the second client, a third-party service or database, or other suitable source. In some examples, the service provider can determine the contextual information based on input received from suitable sources (e.g., the first client, the second client, etc.).

The process 500 may continue at block 506 by the service provider determining profile information of a user profile associated with the first client and the second client. The profile information can include a level of access of a user profile with respect to a library of music tracks including the first set of music tracks. The user profile can be associated with the first client, and the level of access may indicate how many (and of what quality) music tracks are accessible by the user profile. In some examples, the user profile may be a first user profile that is different than a second user profile (which includes a different level of access) associated with the second client. The first user profile and the second user profile may be owned, controlled, operated, or otherwise associated with a common user.

The process 500 may continue at block 508 by the service provider determining client information associated with the second client. The client information may include one or more client configurations relating to music playback. The client configurations can indicate a capability of the client, preferences recorded at the client, and the like. For example, the client configurations of the second client may indicate a maximum quality of music playable by the second client. Additionally, the client configurations of the second client may indicate general, or specified, preferences (e.g., options, settings, etc. relating to music playback) associated with the second client.

The process 500 may continue at block 510 by the service provider generating the second music queue using the contextual information, the profile information, and the client information. The second music queue can include a second set of music tracks, which may be distinct from the first set of music tracks. In other examples, the second set of music tracks may include similar, but distinct, music tracks (e.g., one or more music tracks of the second set of music tracks may be a different version of the same music tracks of the first set of music tracks). In some examples, the contextual information, the profile information, and the client information can be provided to a queue generation service that may be configured to generate music queues for clients. For example, the service provider can receive and/or determine the contextual information, the profile information, and the client information, and the service provider can transmit the received information to the queue generation service. In some examples, the service provider may include or otherwise be in communication with the queue generation service. The service provider can determine the second music queue (or receive the second music queue from the queue generation service).

The process 500 may continue at block 512 by the service provider instructing the second client to play the second music queue. Upon determining and/or receiving the second music queue, the service provider can transmit the second music queue to the second client. Additionally, the service provider can generate and transmit (e.g., with the second music queue) instructions that, when executed by the second client, cause the second client to play the second music queue. In some examples, the instructions can cause the second client to resume playing the current track (from the first music queue). In other examples, the instructions can cause the second client to play a music track that is distinct from the current track.

Figure 6:
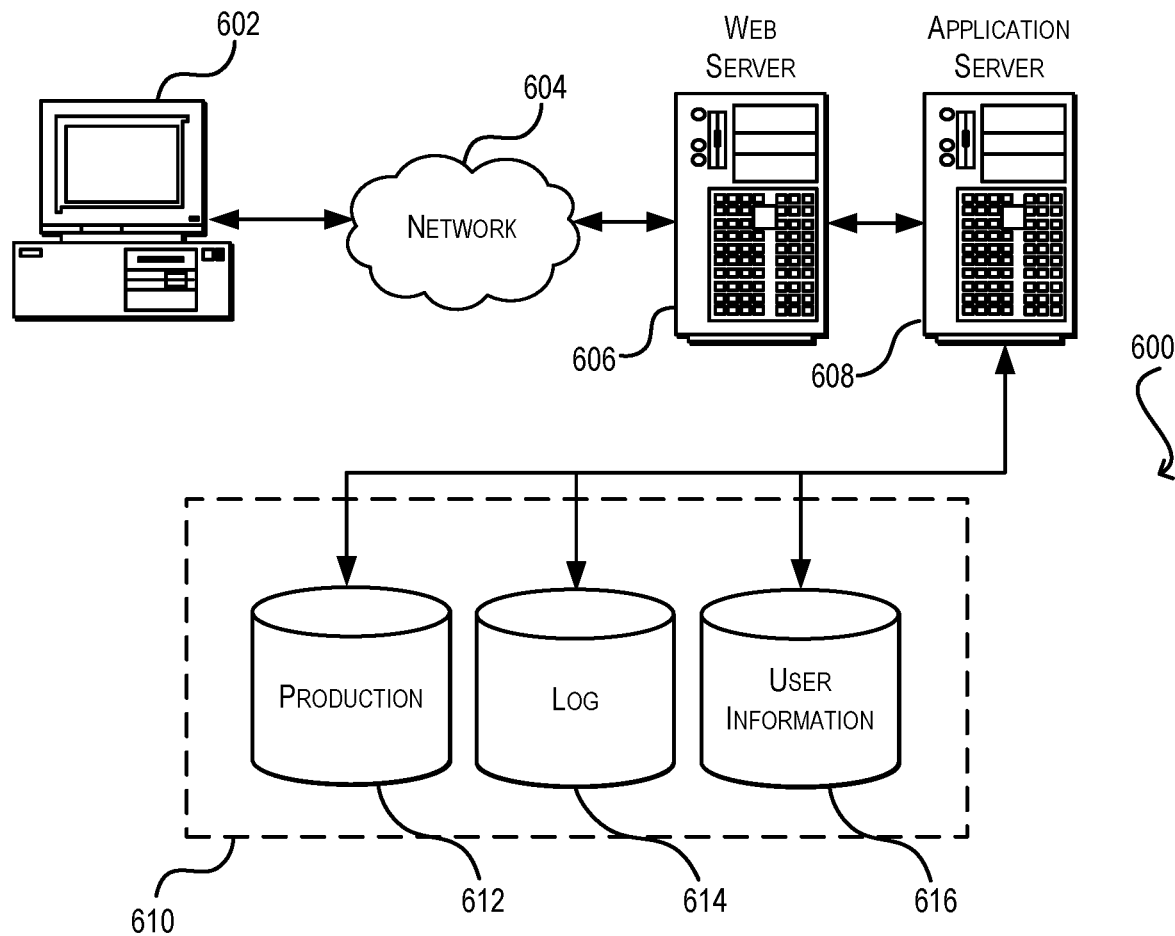
FIG. 6 illustrates an environment in which various embodiments can be implemented.

FIG. 6 illustrates aspects of an example environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the example environment 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable media comprising computer-executable instructions that, when executed by one or more processors of a computer system, cause the computer system to perform operations comprising:
    receiving a request to move playback of a music queue from a first user device to a second user device, the music queue comprising a first set of music tracks including a current music track that is currently playing on the first user device when the request to move playback of the music queue is received;

requesting user device information from the second user device;

evaluating a set of move criteria using: (i) a playback context associated with the first user device, (ii) a user profile associated with the first user device and the second user device, (iii) the user device information associated with the second user device, or (iv) a level of access constraints associated with a library of music tracks comprising the first set of music tracks;

in accordance with a first portion of the set of move criteria being satisfied and based on differences in playback capabilities between the first user device and the second user device, regenerating the music queue to define a regenerated music queue for playback at the second user device and instructing the second user device to resume playback of the regenerated music queue based on the current music track, the regenerated music queue comprising at least some of the first set of music tracks including the current music track; and in accordance with a second portion of the set of move criteria being satisfied, generating a new music queue and instructing the second user device to begin playback of the new music queue based on a new track that is distinct from the current music track, the new music queue comprising a second set of music tracks that is distinct from the first set of music tracks.

2. The one or more non-transitory computer-readable media of claim 1, wherein receiving the request to move playback of the music queue comprises: (i) a first request from the first user device to push the music queue from the first user device to the second user device, or (ii) a second request from the second user device to pull the music queue from the first user device to the second user device.

3. The one or more non-transitory computer-readable media of claim 1, wherein the second set of music tracks is distinct from the first set of music tracks with respect to at least one of: (i) an order of the second set of music tracks, (ii) an advertisement, (iii) the presence or absence of music tracks in the second set of music tracks, or (iv) versions of music tracks in the second set of music tracks.

4. The one or more non-transitory computer-readable media of claim 1, wherein each of the first user device and the second user device is one of a mobile user device, a voice-controlled multimedia device, a speaker system, or a computer, and wherein generating the new music queue comprises generating the new music queue based on a customer intent used to previously generate the music queue.

5. A computer-implemented method, comprising:

receiving a request to move playback of a queue from a first client to a second client, the queue comprising a first set of electronic content items and a current electronic content item currently playing at the first client;

evaluating a set of move criteria using at least one of: (i) a playback context associated with the first client, (ii) a user profile associated with at least one of the first client or the second client, (iii) a configuration associated with the second client, or (iv) a level of access constraints associated with a library of electronic content items;

in accordance with a first portion of the set of move criteria being satisfied and based on differences in playback capabilities between the first client and the second client, regenerating the queue to define a regenerated queue for playback at the second client;

in accordance with a second portion of the set of move criteria being satisfied, generating a new queue for playback at the second client, the new queue comprising a second set of electronic content items that is distinct from the first set of electronic content items; and causing the second client to play the regenerated queue or the new queue.

6. The computer-implemented method of claim 5, wherein the queue and the regenerated queue comprise a matching predefined order of the first set of electronic content items.

7. The computer-implemented method of claim 5, wherein the second set of electronic content items is distinct from the first set of electronic content items with respect to at least one of: (i) an order of the second set of electronic content items, (ii) an advertisement, (iii) presence or absence of electronic content items in the second set of electronic content items, or (iv) versions of electronic content items in the second set of electronic content items.

8. The computer-implemented method of claim 5, wherein the playback context associated with the first client comprises at least one of: (i) an encoding of an original user intent associated with the queue, (ii) a set of electronic content item identifiers corresponding to the first set of electronic content items, (iii) an identification of the current electronic content item of the first set of electronic content items, or (iv) state information for at least one of the first client or the second client.

9. The computer-implemented method of claim 5, wherein the user profile defines a level of access of the user profile with respect to the library of electronic content items comprising the first set of electronic content items and the second set of electronic content items.

10. The computer-implemented method of claim 5, wherein the configuration associated with the second client defines client-specific constraints associated with playback of electronic content items.

11. The computer-implemented method of claim 5, wherein the level of access constraints define digital rights management limitations corresponding to individual electronic content items in the library of electronic content items.

12. The computer-implemented method of claim 5, wherein satisfaction of the first portion of the set of move criteria is indicative of a similar playback experience between the first client and the second client.

13. The computer-implemented method of claim 5, wherein satisfaction of the second portion of the set of move criteria is indicative of a different playback experience between the first client and the second client.

14. The computer-implemented method of claim 5, wherein causing the second client to play the regenerated queue or the new queue comprises causing the second client to play the regenerated queue, and the method further comprises causing synchronized playing of the queue on the first client and the regenerated queue on the second client.

15. The computer-implemented method of claim 5, wherein regenerating the queue to define the regenerated queue comprises at least one of: (i) adding first electronic content items to the first set of electronic content items based on first playback capabilities of the second client, (ii) removing second electronic content items from the first set of electronic content items based on the first playback capabilities of the second client, or (iii) replacing third electronic content items from the first set of electronic content items with fourth electronic content items from the first set of electronic content items based on the first playback capabilities of the second client.

16. The computer-implemented method of claim 5, wherein the new queue excludes the first set of electronic content items.

17. The computer-implemented method of claim 5, wherein the regenerated queue comprises at least some of the first set of electronic content items including the current electronic content item.

18. A computer-implemented method, comprising:
receiving a request to play a second music queue on a second client based on a first music queue that includes a current music track that is currently playing on a first client, the first music queue comprising a first set of music tracks;
determining contextual information associated with the first music queue;
determining profile information of a user profile associated with the first client and the second client, the profile information defining a level of access of the user profile with respect to a library of music tracks comprising the first set of music tracks;
determining client information associated with the second client, the client information defining one or more client configurations relating to music playback;
generating the second music queue using the (i) contextual information, (ii) the profile information, (iii) capability information describing differences in playback capabilities between the first client and the second client, and (iv) the client information, the second music queue comprising a second set of music tracks that is distinct from the first set of music tracks and excludes the current music track; and
instructing the second client to play the second music queue.

19. The computer-implemented method of claim 18, wherein the contextual information comprises at least one of: (i) an encoding of an original user intent associated with the first music queue, (ii) a set of track identifiers corresponding to the first set of music tracks, (iii) an identification of the current music track of the first set of music tracks, or (iv) state information for at least one of the first client or the second client.

20. The computer-implemented method of claim 18, wherein generating the second music queue comprises providing the contextual information, the profile information, the capability information, and the client information into a queue generation service configured to generate music queues for clients.

\* \* \* \* \*